United States Patent

Seiler et al.

[11] Patent Number: 6,078,157
[45] Date of Patent: Jun. 20, 2000

[54] CIRCUIT FOR OPERATING AN ELECTRIC MOTOR DURING SHUT DOWN

[75] Inventors: Hartmut Seiler, Baden-Baden; Ansgar Grass, Offenburg, both of Germany

[73] Assignee: Robert Bosch GbmH, Stuttgart, Germany

[21] Appl. No.: 08/913,300

[22] PCT Filed: Feb. 9, 1996

[86] PCT No.: PCT/DE96/00199

§ 371 Date: Sep. 11, 1997

§ 102(e) Date: Sep. 11, 1997

[87] PCT Pub. No.: WO96/28883

PCT Pub. Date: Sep. 19, 1996

[30] Foreign Application Priority Data

Mar. 11, 1995 [DE] Germany ............... 195 08 880

[51] Int. Cl.[7] .................................................. H02P 3/00
[52] U.S. Cl. ........................................ 318/380; 318/375
[58] Field of Search ........................... 312/370, 375–379, 312/434, 254, 439; 361/23, 31, 54, 56

[56] References Cited

U.S. PATENT DOCUMENTS 3,487,282  12/1969  Gasiorek et al. .
4,104,571   8/1978  Gurwicz et al. .................. 318/380
4,271,383   6/1981  Endo ................................ 318/375
4,275,341   6/1981  Huber et al. ..................... 318/376
4,423,363  12/1983  Clark et al. ...................... 318/375
5,463,540  10/1995  Jones ............................... 362/260
5,705,903   1/1998  Hastings .......................... 318/370

*Primary Examiner*—Jonathan Salata
*Attorney, Agent, or Firm*—Venable; George H. Spencer; Norman N. Kunitz

[57] ABSTRACT

A circuit for operating an electric motor (10) has a triac (24) that is parallel to the electric motor (10). The triac (24) is acted upon by a first control signal (28) that is dependent on the voltage present at a first connection (11) of the electric motor (10). The triac (24) is further acted on by a second control signal (22) that is emitted as a braking signal by a motor-control circuit (19). The circuit of the invention, which includes a semiconductor component (24), permits both a braking of the electric motor (10) and the damping of an inductive voltage peak during the switch-off process of the electric motor (10). The damping of the inductive voltage peak is also assured after the separation of the voltage from an energy source (16).

6 Claims, 1 Drawing Sheet

CIRCUIT FOR OPERATING AN ELECTRIC MOTOR DURING SHUT DOWN

RELATED ART

The invention is based on a circuit for operating an electric motor of the generic type having a semiconductor component contained in a circuit in parallel with the motor.

U.S. Pat. No. 3,487,282 discloses a generic circuit having a thyristor that is contained in a circuit in parallel to a motor. The thyristor is provided for short-circuiting the motor to permit fast braking. A switching transistor that connects a connection of the electric motor to a voltage source as a function of a control signal is provided for switching the electric motor on and off. The inductive voltage peak appearing at the electric motor during the connected-off process is eliminated by a diode switched in parallel to the electric motor.

The abstract of JP 1043082 discloses a further circuit that has a bidirectional thyristor (triac) switched in parallel to the motor. This thyristor is switched on due to a stop signal, causes a short-circuit current and brakes the motor by means of a short-circuit brake.

It is the object of the invention to provide a circuit for operating an electric motor which, with simple means, permits the damping of inductive voltage peaks and braking of the electric motor.

SUMMARY AND ADVANTAGES OF THE INVENTION

The above object generally is achieved according to the present invention by a circuit for operating an electric motor having a triac that is contained in a circuit in parallel to the electric motor, and a control signal that is produced by a signal generator for the triac, with the control signal enabling the current path in one direction in the triac. A further control signal that is dependent on the voltage appearing at a connection of the electric motor is provided for the triac and enables the current path in the opposite direction in the triac.

The circuit of the invention can be embodied particularly inexpensively. In accordance with the invention, a bidirectional thyristor (triac) is provided that is connected in parallel to the electric motor. The triac includes two thyristors that operate in anti-parallel and are integrated into a single silicon crystal. The component includes only one control electrode, by way of which the current path can be enabled (triggered) in the two directions by a pulse, depending on the polarity of the external voltage. The bidirectional thyristor is referred to hereinafter as a triac. The triac takes over both the damping of the inductive voltage peak during the switch-off process of the electric motor and the short-circuiting of the electric motor during the braking process. To embody the circuit of the invention, only a single semiconductor component is required that is also available in a configuration of a surface-mounted device (SMD). The SMD embodiment requires little space on a printed circuit board, and can be attached automatically, resulting in cost advantages in mass production.

The triac provided in accordance with the invention is acted upon by a first control signal that is dependent on the voltage appearing at the electric motor. The first control signal is therefore suited for damping the inductive voltage peak during the switch-off process of the electric motor. The triac is acted upon by a second control signal produced by a signal generator. The second control signal is suited for braking the electric motor.

The basic features of the invention particularly permit reliable operation of the electric motor in applications providing a separation of the circuit from a voltage source by means of a switch. In particular, the first control signal, being a function of the voltage appearing at the electric motor, ensures, in connection with the triac, the damping of the inductive voltage peak during the switch-off process of the electric motor, even after the switch has been opened.

A measure that can be implemented particularly simply provides that the first control signal, being dependent on the voltage appearing at the electric motor, is obtained from the motor voltage by means of a diode. The diode connected directly to a connection of the electric motor and leading to the control input of the triac becomes conductive during the occurrence of the inductive voltage peak.

Another advantageous measure provides that the second control signal for the triac is provided by a motor-control circuit that emits the second control signal as a braking signal for the electric motor. The motor-control circuit simultaneously generates switching signals for a switching transistor that can be provided for switching the electric motor on and off.

Further advantageous measures relate to the use of resistors by way of which the two control signals for the triac are guided. The resistors permit a limitation of the triac gate trigger current.

Further advantageous modifications and embodiments ensue from the following description.

BRIEF DESCRIPTION OF THE DRAWING

The FIGURE shows a circuit diagram of an embodiment of a circuit according to the invention for operating an electric motor.

DETAILED DESCRIPTION OF THE PREFERRED EMBODIMENT

Figure 1:
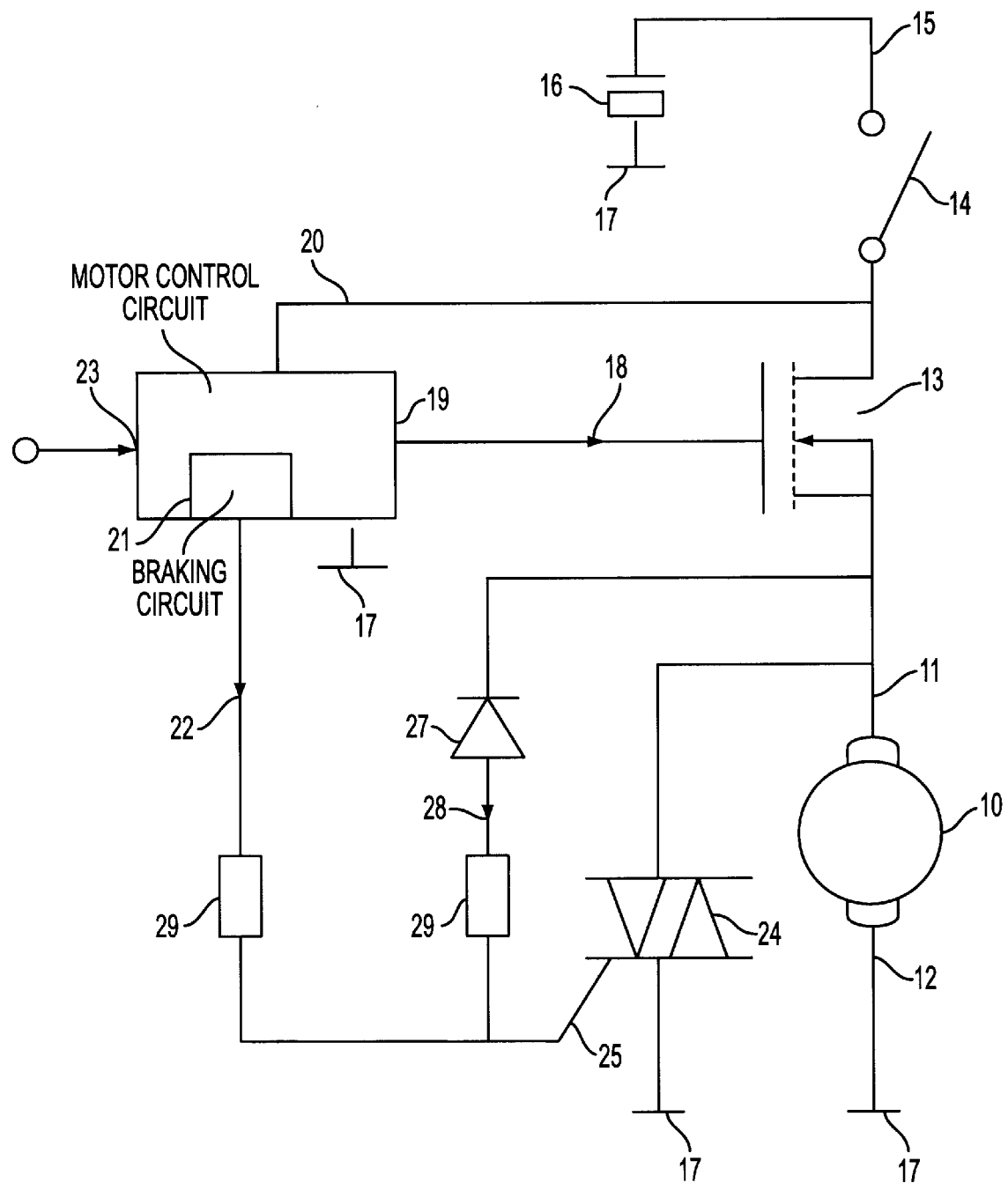

The FIGURE shows an electric motor 10 having a first and a second connection 11, 12. The first connection 11 can be connected by way of a switching transistor 13 and a switch 14 to a first current-supply line 15. The first current-supply line 15 leads to an energy source 16, which provides an operating voltage that appears between the first current-supply line 15 and a second current-supply line 17. The second current-supply line 17 is referred to hereinafter as ground 17. The second connection 12 of the electric motor 10 is connected to ground 17.

The switching transistor 13 is actuated by a switching signal 18 made available by a motor-control circuit 19. The motor-control circuit 19 is supplied with energy by way of an energy-supply line 20 leading to the switch 14, and by way of a line leading to ground 17. The motor-control circuit 19 includes a braking circuit 21, which emits a braking signal 22 referred to hereinafter as the second control signal 22. Both the switching signal 18 and the second control signal 22 are established by the motor-control circuit 19 as a function of an operation-mode signal 23, which is supplied to the motor-control circuit 19 from the outside.

A triac 24 is connected in parallel with the electric motor 10. Its control input 25 is connected to the first motor connection 11 by way of a first resistor 26 and a diode 27 connected in series with the first resistor 26. A first control signal 28 appears at the diode 27. The control input 25 of the triac 24 also has applied to it, via a second resistor 29, the braking signal referred to as the second control signal 22.

The circuit of the invention for operating the electric motor 10 operates as follows:

The electric motor 10 is controlled via the operation mode signal 23, which is supplied to the motor-control circuit 19. The operation-mode signal 23 further establishes, for example, whether the electric motor should also be braked while being switched off. It is necessary to brake the electric motor, for example, in a control drive to reduce overshoot once a predetermined position has been reached. A further application option is in a windshield-wiper drive of a motor vehicle. The wiper arm should stop immediately, through sharp braking of the electric motor 10, after reaching a resting position.

When the electric motor 10 is switched off, two opposing inductive voltages appear. An inductive voltage peak is caused by the change over time of the current flowing through the electric motor 10. To limit this inductive voltage peak, a free-wheeling circuit is provided parallel to the electric motor; the energy stored in the inductance of the electric motor 10 is discharged by way of this circuit. In the illustrated embodiment of the circuit of the invention, a negative inductive voltage peak appears at the first connection 11 during the switch-off of the electric motor 10, bringing the diode 27 into the conductive state. In this operating state, the first control signal 28 appears, and is supplied to the control input 25 of the triac 24 by way of the first resistor 26. The free-wheeling circuit is thus closed. The first control signal 28 then only appears if the switch 14 is opened when the electric motor 10 is running. Only in this instance is the free-wheeling circuit, which is otherwise closed by way of the current-supply lines 15, 17 and the energy source 16, opened and consequently interrupted. In this operating state, the energy supply of the motor-control circuit 19 by way of the energy-supply line 20 is omitted at the same time, so a corresponding switch-on signal for the triac 24 can no longer be provided. The first control signal 28, which depends on the voltage of the electric motor, then always occurs independently of the energy-supply situation if the voltage at the first connection 11 of the electric motor 10 has a value at which the diode 27 becomes conductive.

The electric motor 10 is braked with the second control signal 22 generated by the motor-control circuit 19 in the braking circuit 21. The second control signal 22 supplied to the control input 25 of the triac 24 triggers the triac and short-circuits the electric motor 10.

The two resistors 26, 29 respectively limit the gate-trigger current flowing in the control input 25 of the triac 24.

What is claimed is:

1. Circuit for operating an electric motor (10), comprising a triac (24) that is contained in a circuit in parallel to the electric motor; a signal generator (19) for producing a first control signal (22) with the signal enabling the current path in one direction in the triac (24); and a circuit for producing a further control signal (28) for the triac (24) that is dependent on the voltage appearing at a connection point between the electric motor (10) and an energy source, and that enables the current path in the opposite direction in the triac (24).

2. Circuit according to claim 1, wherein the further control signal (28) is obtained from the first connection (11) of the electric motor (10) via a diode (27).

3. Circuit according to claim 1, wherein the signal generator is a motor-control circuit that produces the further control signal (22) as a braking signal for the electric motor (10).

4. Circuit according to claim 1, wherein a first resistor (26) is provided for limiting the current of the further control signal (28).

5. Circuit according to claim 1, wherein a second resistor (29) is provided for limiting the current of the first control signal (22).

6. A motor control circuit comprising:

an electric motor connected via a switch across a source of energy;

a triac connected in parallel with the electric motor;

a control circuit for controlling said switch and for supplying a control signal to a control electrode of the triac to trigger the triac to conduct in a first direction; and a diode that is connected between the control electrode of the triac and a connection of the motor with the switch and that has a polarity to trigger the triac to conduct in the opposite direction when the polarity of the voltage of said connection reverses from its normal polarity.

* * * * *